(12) United States Patent
Bartos et al.

(10) Patent No.: US 8,415,946 B2
(45) Date of Patent: Apr. 9, 2013

(54) ARRANGEMENT AND METHOD FOR MAGNETIC DETERMINATION OF A LINEAR LENGTH OR A ROTARY ANGLE

(75) Inventors: Axel Bartos, Waltrop (DE); Fritz Dettmann, Braunfels (DE); Armin Meisenberg, Dortmund (DE)

(73) Assignee: Meas Deutschland GmbH, Dortmund (DE)

( * ) Notice: Subject to any disclaimer, the term of this patent is extended or adjusted under 35 U.S.C. 154(b) by 0 days.

(21) Appl. No.: 12/528,010

(22) PCT Filed: Feb. 21, 2008

(86) PCT No.: PCT/EP2008/001375
§ 371 (c)(1),
(2), (4) Date: Feb. 12, 2010

(87) PCT Pub. No.: WO2008/101702
PCT Pub. Date: Aug. 28, 2008

(65) Prior Publication Data
US 2010/0141244 A1 Jun. 10, 2010

(30) Foreign Application Priority Data
Feb. 21, 2007 (DE) .......................... 10 2007 008 870

(51) Int. Cl.
*G01B 7/14* (2006.01)
(52) U.S. Cl.
USPC .................................................... 324/207.21
(58) Field of Classification Search ............. 324/207.14, 324/207.15, 245, 247, 253, 326, 345, 559, 324/207.21, 207.25, 206; 250/231.13; 346/139 R; 318/653; 33/708
See application file for complete search history.

(56) References Cited

U.S. PATENT DOCUMENTS

| | | | |
|---|---|---|---|
| 5,434,602 A * | 7/1995 | Kaburagi et al. ......... 346/139 R |
| 5,680,042 A | 10/1997 | Griffen et al. | |
| 2003/0141455 A1 | 7/2003 | Lambert et al. | |
| 2004/0017187 A1 * | 1/2004 | Van Ostrand et al. ... 324/207.21 |
| 2004/0173735 A1 | 9/2004 | Williams et al. | |
| 2004/0229398 A1 | 11/2004 | Magerlein et al. | |
| 2007/0096723 A1 * | 5/2007 | Rieger et al. ............. 324/207.24 |

FOREIGN PATENT DOCUMENTS

| | | |
|---|---|---|
| DE | 44 36 784 A1 | 4/1995 |
| DE | 197 54 524 A1 | 6/1999 |
| DE | 199 10 636 A1 | 9/2000 |
| DE | 100 10 042 A1 | 7/2001 |

(Continued)

OTHER PUBLICATIONS

Communication from the Examining Division of the European Patent Office mailed Sep. 12, 2012 in connection with related Application No. 08 707 788.9.

*Primary Examiner* — Jermele M Hollington
*Assistant Examiner* — Alesa Allgood
(74) *Attorney, Agent, or Firm* — Howard IP Law Group, PC

(57) ABSTRACT

Disclosed are absolute measuring systems comprising measuring rods that are composed of groups of at least two magnetic segments. The magnetic segments of at least one group have the same length in the direction of measurement while the magnetic segments of the different groups have different lengths. For arrangements encompassing more than two sensors on the single-track measuring rods, multistage phase difference processes are disclosed which result in high resolutions and accurate measurements while allowing for great measured lengths and, when anisotropic magnetoresistive sensors are used, for example, an unambiguous angle measurement range of 360°. FIG. 6*a* best represents the essence of the invention.

29 Claims, 6 Drawing Sheets

FOREIGN PATENT DOCUMENTS

| | | | |
|---|---|---|---|
| DE | 4436784 | * | 8/2005 |
| DE | 102004063462 | | 3/2006 |
| DE | 102005009923 | | 9/2006 |
| DE | 102005031333 | | 1/2007 |
| EP | 0 810 420 A2 | | 12/1997 |
| JP | H/09-329499 | | 12/1997 |
| WO | WO 2005/119179 | | 12/2005 |
| WO | WO2006/035055 | | 4/2006 |

* cited by examiner

ARRANGEMENT AND METHOD FOR MAGNETIC DETERMINATION OF A LINEAR LENGTH OR A ROTARY ANGLE

CROSS-REFERENCES TO RELATED APPLICATIONS

This application is the U.S. National Stage of International Application No. PCT/EP2008/001375, filed Feb. 21, 2008, which designated the United States and has been published as International Publication No. WO 2008/001375 and which claims the priority of German Patent Application, Serial No. 10 2007 008 870.3, filed Feb. 21, 2007, pursuant to 35 U.S.C. 119(a)-(d).

BACKGROUND OF THE INVENTION

The invention relates to a magnetic length or angle measuring system used, for example, for automatically determining positions, lengths or angles in mechanical engineering, automotive engineering or precision mechanics. The "absolute" system provides the corresponding values independent of the movement of the system components, in particular also at rest.

Such absolute magnetic length or angle measuring systems are known in the art. The measuring arrangement described in the published application DE 197 54 524 should be mentioned first. The scale is here implemented as a thread applied on a magnetic material, with the pitch individually changing from one winding to the next, in particular, with the pitch monotonously increasing in the measurement direction x. At least two magnetic field sensors which are spaced perpendicular to the measurement direction, are provided at the same x-value in the measurement head facing the scale. They are used to identify the corresponding thread pitch which can then be associated with the absolute position. Disadvantageously, the material of the scale must be soft-magnetic. Stray fields magnetize magnetic materials that can be used in practice, which may cause significant measurement errors. In addition, with variable pitch, very small values are required for the pitch. With such small values, however, the detectable changes in the magnetic field are particularly small, if the sensor and scale are not separated by a minimum distance. In addition, a necessary adjustment of auxiliary magnets for each sensor is complex.

The last disadvantage is eliminated with the arrangement according to DE 199 10 636 (FIG. 12, claims 16 and 17), because in this case a cylindrical hard-magnetic scale is used, wherein a magnetic thread with variable pitch is produced by magnetizing. The difference angle of the field directions between the positions of the two sensors can be determined with two magnetoresistive angle sensors which are spaced in the measurement direction. This difference can be absolutely associated with the position when using anisotropic magnetoresistive sensors, as long as the difference is less than 180°, with Hall sensors or GMR sensors up to 360°. The overall length of the absolute measurement is limited in that between the two sensors at the end of the measurement distance only one pitch more than at the beginning must exist. High-resolution is achieved by accurate evaluation of the angle value of one of the two sensors. As an additional disadvantage, manufacture of the magnetic threaded rod, in particular with a small pitch required to attain a high resolution of the length determination, is very complex. Rotation of the scale or parts thereof must be prevented, because it directly produces measurement errors for high-resolution.

An arrangement according to WO 2006/035055 no longer has the latter disadvantage. A cylindrical scale is here proposed which has in the measurement direction magnetic segments with alternating polarity and different length. Rotation of the scale does then no longer affect the measurement result. However, the invention according to WO 2006/035055 not only relates to cylindrical scales, but to all cross sections of scales where the segments of different length have alternating polarity. With two sensors spaced apart in the measurement direction which measure the angle of the direction of the magnetic field relative to the measurement direction, the phase difference between these two locations, which is proportional to the position of one of the two sensors, is deduced. For increasing the resolution of the position value, the number of the segment of the scale that faces the one sensor is first determined from the phase difference, with the resulting value of the angle of the field direction then indicating how far of the sensor has advanced relative to the start of the segment. The employed magnetic field sensors each consist of two sensor elements which are at the same location in the measurement direction and produce signals that depend on the field angle. It is assumed in the evaluation that the angle within each segment increases linearly with the position, or in other words, that the sensors provide values with respect to the respective segment length that are proportional to the sine and cosine of the field angle. The actual curve, however, deviates from the simplified assumptions for two reasons. On one hand, the magnetic field of the segments has harmonic contributions which decrease with increasing distance from the scale, with their amount determined by the segment length. Other hand, additional harmonic contributions are generated in the magnetoresistive sensors, which increase with decreasing field strength acting on the sensors. However, the field strength at the distance of the sensor varies strongly with the segment length so that continuously changing harmonic contributions are operating along the measurement direction. This limits the measurement accuracy, because the determined signal can be associated with a certain segment only over a limited number of segments, which diminishes the length resolution within the segment length.

DE 100 10 042 proposes linear magnetic measuring systems for application in the automotive industry. A large number of different configurations for the scale are disclosed. The problem with absolute measurements, however, is nowhere discussed in the document and can also not be inferred from the disclosed fact pattern. Accordingly, this document also does not provide any suggestion how absolute measuring systems for large measurement distances and a high-resolution can be designed.

SUMMARY OF THE INVENTION

It is therefore an object of the invention to provide arrangements and methods for absolute magnetic length and angle measuring systems which have a simple structure and provide higher resolution, smaller measurement errors and greater measurement distances.

According to one aspect of the invention, the object is obtained by an arrangement for absolute determination of the linear position or of the rotation position expressed by an angle of two bodies that can be displaced or rotated relative to one another, wherein a first body has a scale with a plurality of magnetic segments that alternate in polarity in the measurement direction and a second body has at least two spaced-apart magnetic field sensitive sensors and which includes an evaluation unit, wherein the scale is composed of groups of at least two magnetic segments, wherein the lengths of the magnetic segments in the measurement direction in at least one group are identical to one another and wherein the lengths of the magnetic segments of the different groups are different from one another.

According to one aspect of the invention, the object is obtained by a method for absolute determination of the linear position or of the rotation position expressed by an angle of two bodies that can be displaced or rotated relative to one another, wherein an output signal is calculated from a plurality of sensor signals in the evaluation unit, with the output signal unambiguously associated with the linear or rotation position.

According to the invention, the scale of the arrangement for absolute length and angle determination in the measurement direction is composed of groups of magnetic segments, the lengths of the magnetic segments in at least one of the groups are identical to one another and the lengths of the magnetic segments of the different groups are different from one another. The groups of magnetic segments are arranged in a single track, i.e., consecutively in the measurement direction. Advantageously, disturbances causing measurement errors in the magnetic field distribution, as known from conventional multi-track magnetic scales of absolute measurement devices, are essentially eliminated.

By using a structure of magnetic scales made of groups of magnetic segments, which can have the same length within the groups and different lengths from group to group, an absolute angle or length position determination which assumes different segment lengths can advantageously be employed, while substantially maintaining the known advantage of high resolution, precision and a large scale length of incremental measurement arrangements that work with constant segment length.

An absolute determination of the position is not only distinguished in that the position value can be determined from a single measurement independent of the movement between the scale and the sensors, but also in that the obtained position value is uniquely associated with the scale structure and the scale can only be calibrated during manufacture. Magnetic scales have particular features which always cause strong deviations from the normal field direction distribution near the start and the end of the scale as compared to those segments that are remote from the ends, although the segment length is maintained error-free during the magnetization of the material forming the scale. This applies at least to two corresponding segments. According to the invention, groups of segments of identical length are arranged at the two ends of the scale. The two spaced-apart sensors then do not measure a change in the phase difference, indicating that the measurement range has been exceeded. Advantageously, the message that the measurement range has been exceeded, can be used by the system itself to controllably adjust the scale at the part where the movement should actually be monitored.

Two particular features significantly reduce the accuracy of the position measurement with known scales having magnetic segments of variable length. These are an increasing magnetic field strength with increasing segment length and a displacement of the zero crossing of a field component and hence the phase value in the direction of the respective shorter segment, which always makes this shorter segment appear to be shorter with increasing distance between the sensor and the scale surface. According to the invention, these deviations can be significantly reduced by increasing the thickness of the magnetic segments of the scale with their decreasing length in the measurement direction. This can be attained by making the thickness of the magnetic layer forming the scale dependent on the position, or by advantageously magnetizing the material in each segment to a depth that depends on the segment length, while the thickness of the magnetizable material remains at a constant value. According to the invention, the surface of the scale can also be covered with a non-magnetic layer having a thickness that increases with the length of the segments at the respective location. In this way, the distance to the sensor increases with increasing segment length which reduces the field. However, the segment length must be corrected commensurate with the thickness of the non-magnetic layer in order to compensate the shift of the zero crossings of the field components.

According to a preferred embodiment of the invention, two adjacent magnetic segments in a magnetic scale are combined to a group and have the same length. The position of the zero crossing of the phase value at the separation line of the segments having the same length then advantageously remains independent of the distance between the sensor and scale surface while, on the other hand, the length of the scale is doubled for the same change in the length of the segments. By increasing the distance between the two sensors for the phase difference determination, the same phase gradient per scale length unit and hence the same accuracy in the determination of the segment facing the first sensor can be obtained as with conventional scales where the length of the segments changes monotonously.

Preferably, magnetoresistive sensors can be used as measuring elements for the arrangements. Both anisotropic magnetoresistive sensors and GMR sensors can be used which are each configured as measuring elements for determining the directional angle of the magnetic field. It should be noted that the measurement range in which a certain field angle can be unambiguously determined from the measurements, is limited to 180° for anisotropic magnetoresistive sensors, and to 360° for GMR sensors. Magnetoresistive sensors each contain two sensor elements which are preferably formed of measurement bridges constructed of magnetoresistive thin-film resistors. The two measurement bridges are either symmetric about the same x-coordinate of the sensor and rotated relative to one another by an angle equal to a quarter of the unambiguous measurement range, or the two measurement bridges are spaced apart in the measurement direction of the scale which is equal to a field rotation of the same value caused by the scale when advancing in the measurement direction. The spacing for anisotropic magnetoresistive sensor is then a quarter of the segment length and half a segment length for GMR sensors. Advantageously, sensors with rotated measurement bridges are used, when only a few segments of identical length are present in the scale and the segments have very different lengths from one another. For scales with a plurality of segments of identical length and small changes in the segment lengths, sensors with offset measurement bridges have significant advantages, in particular when magnetoresistive thin-film resistors of the measurement bridges are distributed to allow filtering of the harmonics in the magnetic field distribution of the scale from the bridge signals (see, for example, DE 2005 009 923). Such measuring arrangements can attain the high resolution and accuracy of incrementally operating measuring systems even for absolute measurements.

Two sensors, each having two sensor elements, are required to determine a phase difference that can be used to obtain the position of a certain segment and the desired absolute position. The number of segments whose position can be unambiguously identified is limited by the measurement errors in the phase difference. According to the invention, the resulting limit is substantially expanded by employing a third identical sensor mounted on a common sensor support, with the distance between the third and first sensor being at least twice the distance between the first and second sensor. The distance between the first and second sensor is selected so that the phase difference determined by the first and second sensor during movement of the sensor support over the entire length of the scale does not exceed the unambiguousness range of the sensors. An association with a certain segment of the scale is then always possible in principle; however, measurement errors can falsify the results to a degree so that only a region closely surrounding the segment can be determined. The phase difference between the first and third sensor increases more strongly due to the greater distance during movement of the sensor support, so that this phase difference can be associated with a segment faster and with a significantly smaller error. Because this phase difference exceeds the unambiguousness limit of the sensors, both differences are required for determining this segment. By adding another sensor, as compared to other arrangements, the number of segments of the scale can be significantly increased. This can also be used for increasing the length of the scale or for increasing the resolution and the measurement accuracy.

Arrangements for angle measurements with circular scales (magnet wheels) can be advantageously implemented based on the invention. Preferably, magnet wheels are used where the magnetic segments are arranged mirror-symmetric with respect to a plane in which the rotation axis is located. Such magnet wheels may, for example, only have two groups of segments, with each group having segments of identical length. When arranging five sensors having an unambiguousness range of 180° and a structure advantageously suitable for filtering harmonics, the angular value of the magnet wheel can be determined unambiguously over a full revolution and with a resolution and accuracy which corresponds to an incremental measurement. The same results can be obtained with three sensors with an unambiguousness range of 360°.

Similar properties can also be attained with another mirror-symmetric magnet wheel with n segments where the length of the segments varies such that the angle of the field direction $\beta$ for a full revolution of a=0 to 360° about the magnet wheel is given by the relationship $\beta(a)=a*(1+n/2)+A*\sin(a)$ (A=const.). Two identical sensor pairs, each having two spaced-apart sensors, are required, which are arranged with an offset, preferably an angle of 90°, on the periphery of the magnet wheel. The number of sensors does not depend on the unambiguousness range of the sensors. In this arrangement, two phase differences are determined with the sensor pairs, which are related to the rotation angle of the magnet wheel by sine and cosine functions, respectively. The rotation angle is therefore determined similar to the position within the range of a segment by identifying a quadrant and an arctan interpolation. With the aforedescribed arrangement, adjacent segments have advantageously only a small difference in length. Accordingly, the shift of the location of the zero crossing of the field component with the spacing between sensor and the surface of the scale and hence the change of the effective length of the segment can be neglected. With a monotonously increasing segment length along the periphery of the magnet wheel, the longest and shortest segment would be adjacent to one another, which would produce the greatest displacement error and determine the measurement error of the entire arrangement.

The method for absolute determination of linear and rotational position with an arrangement described in the claims involves calculating from a plurality of sensor signals in an evaluation unit an output signal that is uniquely associated with the respective position. In the simplest case, signals from two sensors which each consist of two sensor elements and which are arranged in spaced-apart relationship proximate to the scale are used to determine the angles of the field directions at the two sensor locations with conventional methods, for example by an arctan interpolation. The phase difference, which is directly associated with the position to be measured, is formed by forming the difference. The obtained position values have limited accuracy. The accuracy can be improved by initially determining from the phase difference the number of the scale segment facing one of the two sensors. The distance between the center and the beginning of the segment in this measurement is determined from the angle of the field direction determined by this sensor and by assuming a linear increase in the angle over the segment length. These two signal portions provide a significantly more accurate results for the position. The measurement accuracy can be further improved with the invention in that the corresponding segments facing the sensors are determined for two or more sensors and the values for the position of the two or more sensors are obtained by taking into consideration the measured angle of the field direction at the location of the sensors. An improved final value for the position is then obtained by averaging the position results while taking into account the spacing between sensors.

According to the invention, not only sensors with two sensor element bridges which are rotated with respect to one another by an angle of one quarter of their unambiguousness region, but also sensors where the sensor element bridges are offset relative to one another in the measurement direction, can be used for absolute length measurements on scales with the aforedescribed features. If the offset corresponds to one quarter of the segment length for sensors with an unambiguousness range of 180° (e.g., anisotropic magnetoresistive sensors), or one half of the segment length for sensors with an unambiguousness range of 360° (e.g., GMR sensors), then the arctan interpolation can be readily used to determine the angle of the field direction, because the fields of the segments having this offset are then rotated by a quarter of the unambiguousness range. This agreement does in principle not apply to variable segment lengths. As has been observed, the simple arctan interpolation can nevertheless initially be used. The phase difference formed with this preliminary result produces an approximate value for the number of the required segment and therefore an approximate value for the actual segment length. The interpolation for determining the angle of the field direction is then repeated with this value, producing a better approximation. The method produces iteratively increasingly more accurate results. In practical applications, two iteration steps are frequently sufficient. Advantageously, sensors with a linear offset of the sensor element bridges are used, if the magnetoresistive thin-film resistors are configured to suppress harmonics. Although this distribution can only be optimized for a well-defined segment length, it still at least partially operates for small deviations therefrom. The position can then be determined with greater measurement accuracy. This is particularly advantageous when the scale has a plurality of segments of identical length or segments with only small differences in length.

BRIEF DESCRIPTION OF THE DRAWING

The invention will now be described in more detail with reference to exemplary embodiments. The appended drawing shows the following:

FIG. 1 a measuring system for absolute length determination according to the invention with two sensors, FIG. 2 the phase dependence of a scale with different segments, FIG. 3a the magnetic field dependence of a scale with different segments, FIG. 3b possible dependence of the thickness of the magnetic material for correcting the field, FIG. 4a a measuring system for absolute length determination according to the invention with linear dependence of the phase difference and with three sensors, FIG. 4b the dependence of different phase differences of the arrangement of FIG. 4a, FIG. 4c length of periods of the linear measuring system of FIG. 4, FIG. 5a absolute angle measuring system according to the invention with two groups of segments, FIG. 5b phase differences of different sensors of the system according to FIG. 5a, FIG. 5c phase differences of the system of FIG. 5a with GMR sensors, FIG. 6a absolute angle measuring system according to the invention with symmetrically arranged segment pairs of different length, FIG. 6b distribution of the segment length of the system according to FIG. 6a for a sinusoidal phase difference, and FIG. 6c phase differences as a function of the rotation angle for the system according to FIG. 6a.

DETAILED DESCRIPTION OF PREFERRED EMBODIMENTS

Figure 1:
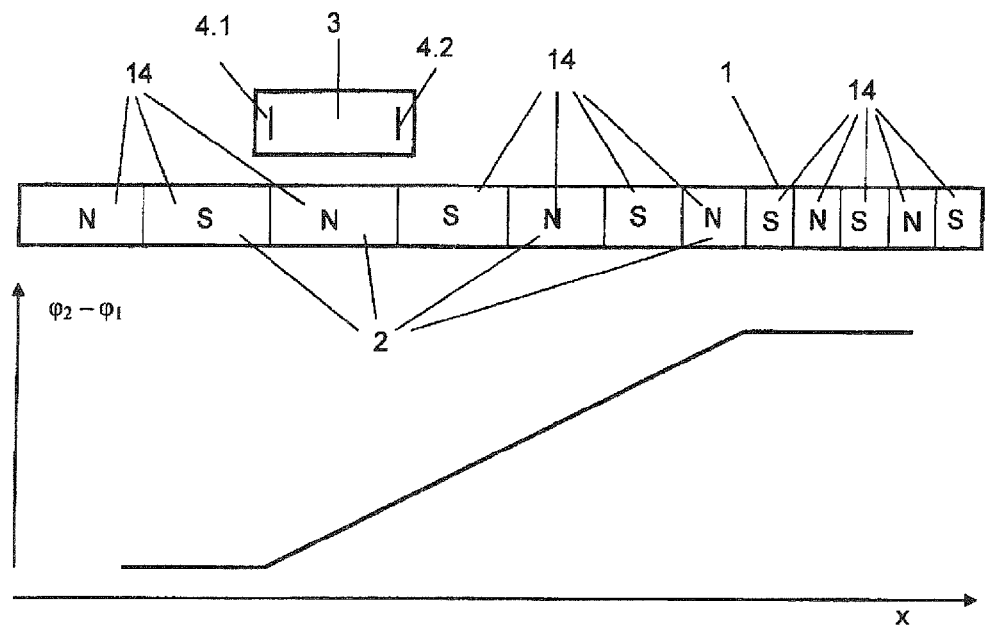

FIG. 1 shows a schematic diagram of an absolute length measuring system according to the invention and a calibration function of the system. A magnetic scale 1 is composed of a plurality of permanent magnet segments 2 which are differentiated by the symbol N (North pole) and S (South pole). This indicates that directly adjacent segments 2 are magnetized in opposite directions. A scale magnetized perpendicular to the drawing plane shows on its surface the indicated poles. However, it is assumed in the exemplary embodiment to be described below that the segments N have a magnetization direction pointing to the right and the segments S have a magnetization direction pointing to the left. The segments 2 of the scale are combined into groups 14. A first group 14 includes from the left the first three segments 2, which all have the same length in the measurement direction x. A second group 14 in the center region includes four segments 2, which have different lengths in the measurement direction. The third group 14 at the right end of the scale is composed of five segments 2 which each have the same length. A sensor support 3 on which two sensors 4.1 and 4.2 are arranged with a predetermined separation is arranged above the scale 1 and can move freely in the measurement direction x. In the described exemplary embodiment, these are anisotropic magnetoresistive sensors. Each sensor 4.1, 4.2 is composed of two sensor elements. The sensor elements are Wheatstone bridges, each consisting of four resistors formed by anisotropic magnetoresistive thin-film strips having resistance values that depend on the direction of the applied magnetic field, in this case the magnetic field of the scale 1. The resistance changes over a full period upon rotation of the field by 180°. The output signals of the bridges are then also periodic with this angle. With a linear increase of the direction angle of the magnetic field of the scale 1, the output signal of the bridges changes sinusoidally when the sensor support 3 is moved in the measurement direction x. When the respective two sensor elements of the sensors 4.1, 4.2 are rotated on the sensor support 3 relative to one another by 45°, a phase shift is introduced between the respective bridge signals equal to one quarter of the period length. One of the bridges then supplies a signal proportional to $\sin(2*p*x/\lambda)$, while the other bridge supplies a signal proportional to $\cos(2*\pi*x/\lambda)$, wherein $\lambda$ indicates the length of a segment 2. The angle of the field direction at the location of the sensor can be determined from these two signals by an arctan interpolation, which is also referred to as phase in the unambiguous range. The locations of the sensors 4.1, 4.2 are illustrated in FIG. 1 without having a length in the measuring direction x. The indicated lines are the symmetry lines of the two respective Wheatstone bridges of the sensors 4.1, 4.2 which are arranged in the vicinity of the lines.

The lower part of FIG. 1 shows in a diagram the phase difference $f_2-f_1$ resulting from a movement of the sensor support 3 in the measurement direction x along the scale 1. In the center region where the segment length decreases with increasing x, the phase difference $f_2-f_1$ increases with increasing x. The x value, where the sensor 4.1 is located, is uniquely associated with the value of the phase difference $f_2-f_1$. Groups of segments 14 with identical length are arranged at both ends of the scale 1. The phase difference remains here constant wherein the sensor support 3 moves. This value can be an indication if the measurement range of the system has been exceeded upward or downward. Begin and end of the measurement range can be determined accurately, because the phase of the first sensor 4.1 has here a zero crossing, which can be used to adjust parts of the measuring system relative to the position of the bodies. Control of their relative position with respect to one another represents the actual measurement task.

Figure 2:
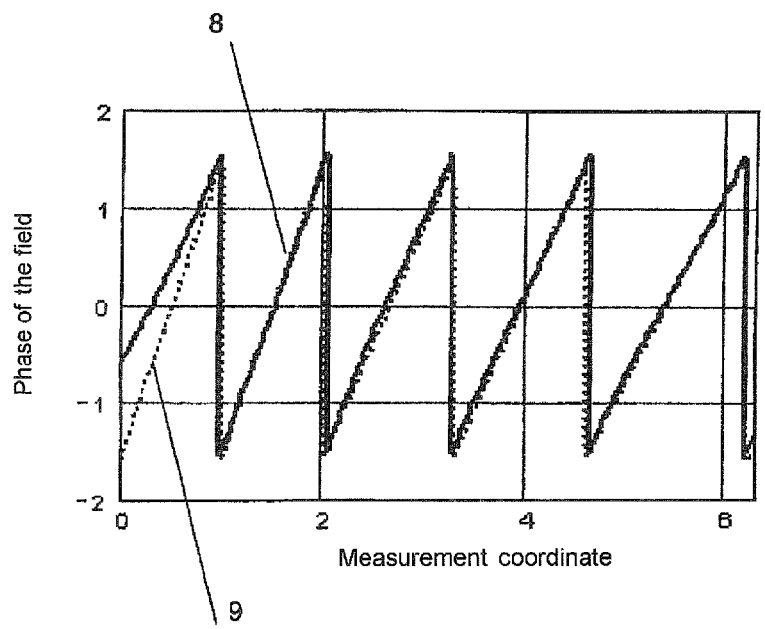
Figure 3A:
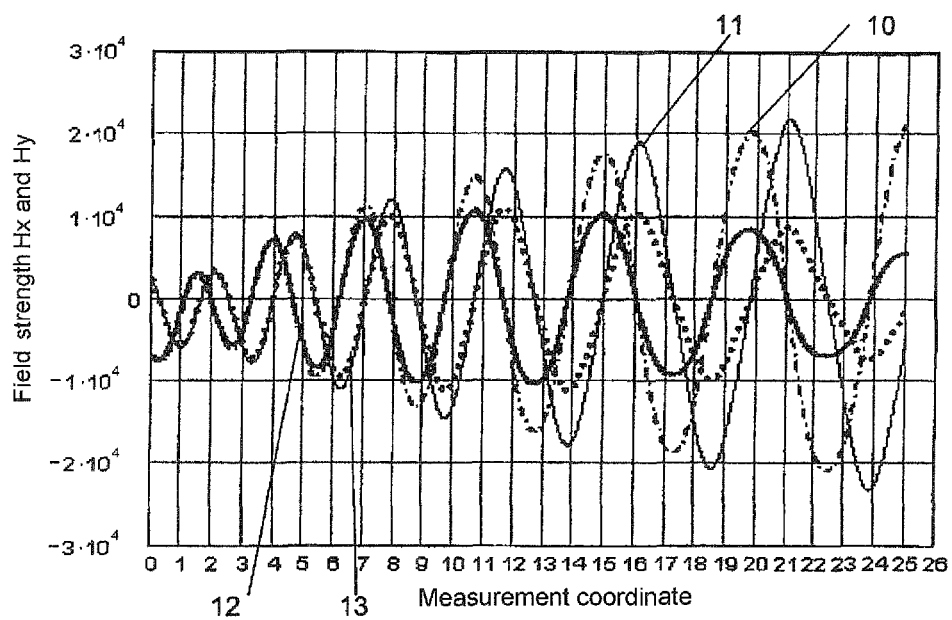

No phase differences $f_2-f_1$ are present in the diagram for the region of the edge segments of the scale 1. The reason for that is evident from FIG. 2 and FIG. 3. FIG. 2 shows the phase of the field 8 across the first five segments 2 of a scale in comparison to their ideal course 9, which assumes a linearly increasing angle over the segment length by 180° (corresponds to p in radians). It is clear that both requirements are not met by the edge segment. FIG. 3a illustrates the magnetic fields $H_x$ 10 and $H_y$ 11 produced by the scale for a number of segments 2 for a scale 1 that extends over 25 mm. As can be seen, the magnetic field strength is substantially less above the second segment from the edge of the steel 1 than above the segments 2 remote from the edge. This small field strength causes erroneous angle values in the magnetoresistive sensors 4.1, 4.2. It is therefore evident that the at least two respective edge segments of magnetic scales are unsuitable for an absolute position determination. A body whose position is to be determined at the mechanical end of the scale 1 can hence not be adjusted. However, the adjustment can be performed with the arrangement according to FIG. 1.

Figure 3B:
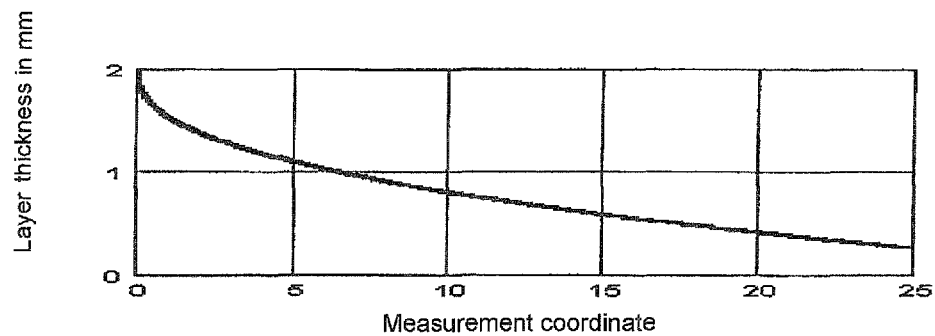

FIG. 2 shows the course of the phase angle for a scale 1, where the two segments 2 of each pole pair have the same length. A phase jump of 180° (p) is clearly visible in this representation at each segment end, showing the effective position of the segment boundaries. The actual boundaries and the effective boundaries substantially are in agreement for segments 2 of identical length. Deviations are noticeable between segments 2 of different length. These increase with increasing distance between the sensors 4.1, 4.2 and the scale 1. According to the invention, the thickness of the magnetized permanent magnet layer of the scale 2 is adjusted depending on the length of the segments in order to reduce these deviations and to attain an amplitude of the magnetic field components that is essentially unchanged across the entire length of the scale. FIG. 3 shows a comparison of the course of the field components $H_x$ and $H_y$ for a constant thickness of the permanent magnet layer 10; 11 and for an adapted thickness 12; 13. The dependence of the adapted thickness is illustrated in FIG.

3b. FIG. 3a shows the decrease of the field amplitudes in segments 2 near the edges that is observed in spite of this correction.

Figure 4:
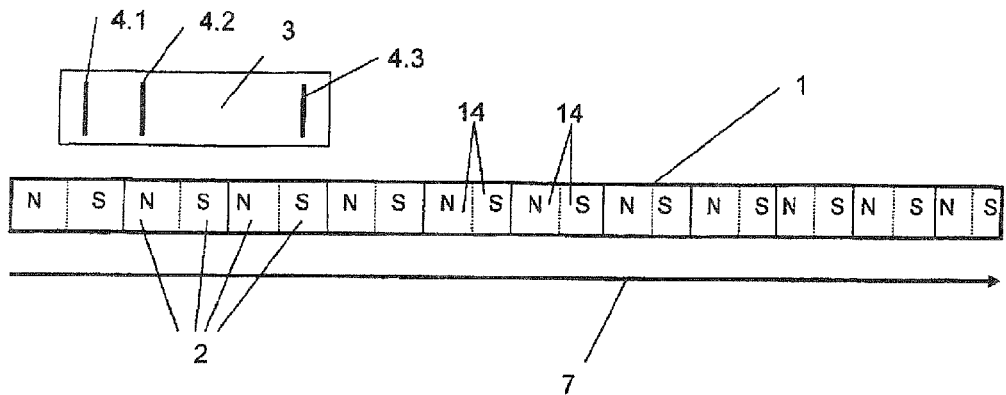
Figure 4:
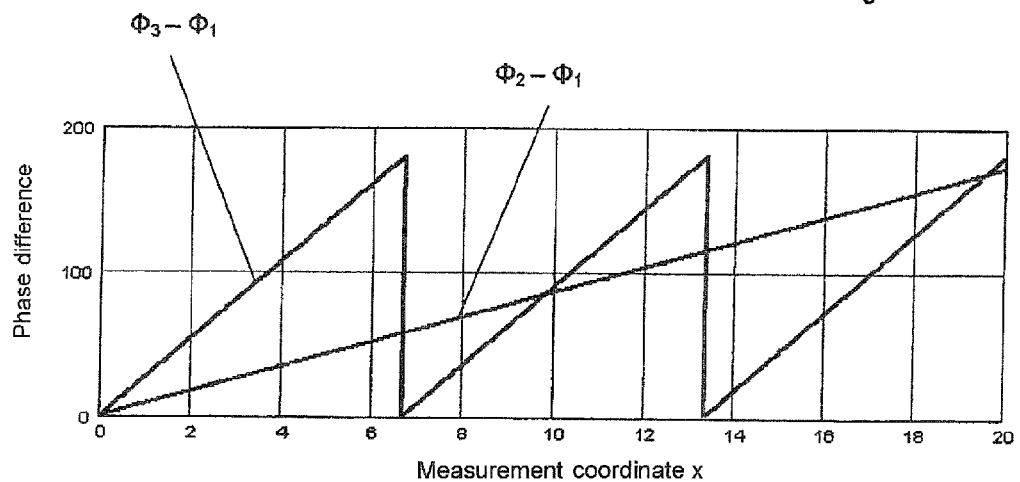
Figure 4:
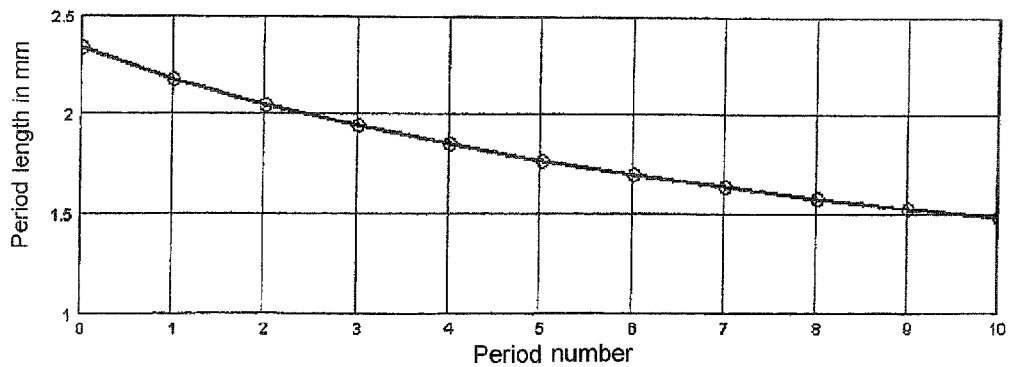

Another exemplary embodiment of the invention is shown schematically in FIG. 4a. A magnetic scale 1 which is composed of groups 14, with each group having two segments 2 of identical lengths, extends in the measurement direction x 7. The length of the segments 2 in the groups 14 decreases when advancing in the measurement direction 7. A sensor support 3 which is movable in the measurement direction 7 is arranged above the scale 1. The sensor support 3 has three sensors 4.1; 4.2; 4.3 which are configured to determine the angle of the field direction at the respective position. The lines indicated at the respective sensor location on the sensor support 3 are symmetry lines of two respective magnetoresistive sensor elements implemented as Wheatstone bridges. The spacing between the two sensors 4.1 and 4.2 is selected such that the phase difference measured between the two sensors 4.1; 4.2 does not exceed the unambiguousness region of the sensors, which is 180° for anisotropic magnetoresistive sensors. As shown in FIG. 4b, the phase difference $f_2-f_1$ increases exactly linearly with increasing value of the measurement coordinate x, 7, which is the case when the length of the groups 14 have, for example, the values indicated in FIG. 4c. The length of the groups 14 is here equal to the period length of the magnetic field curve, formed by an S-N pair. The position of the first sensor 4.1 can be uniquely derived from the phase difference $f_2-f_1$. The phase difference $f_3-f_1$ can be used to increase the resolution and accuracy of the position determination. Because the spacing between sensor 4.3 and sensor 4.1 is selected to be three times the spacing between sensor 4.2 and 4.1, this phase difference also increases three times as fast as the difference $f_2-f_1$. The unambiguousness region of the sensors is then exceeded, resulting in the selected example in three periods for the phase difference $f_3-f_1$ along the entire length of the scale. The evaluation circuit, which is not shown in FIG. 4a, associates the value of the difference $f_2-f_1$ with the period of the position where the sensor 4.1 is located. The resolution and accuracy can be further improved by not conclusively identifying the position immediately from the phase difference $f_3-f_1$, but by determining from its value which segment 2 faces the sensor 4.1, and thereafter determining the position from the phase determined with the sensor 4.1. With this three-step process, a smaller change in the length from one group 14 to the next group 14 is required for reliably identifying the segment 2 facing the sensor 4.1 for the same length of the scale 1 than with the two-step process, so that a significantly longer, scale 1 can be used with the same change in the length.

The measurement accuracy can be further improved by identifying in the evaluation unit for all three sensors 4.1; 4.2; 4.3 the corresponding opposing segments 2, by determining with high resolution from the phase value of the magnetic field measured by the corresponding sensor 4.1; 4.2; 4.3 the position relative to the start of the respective identified segment 2, and obtaining the position of the first sensor 4.1 as an average by taking into consideration the offset of the identified segments 2.

The problems associated with the edge segments discussed above is, of course, also relevant with the selected example. However, this problem was not discussed again for sake of clarity.

Figure 5:
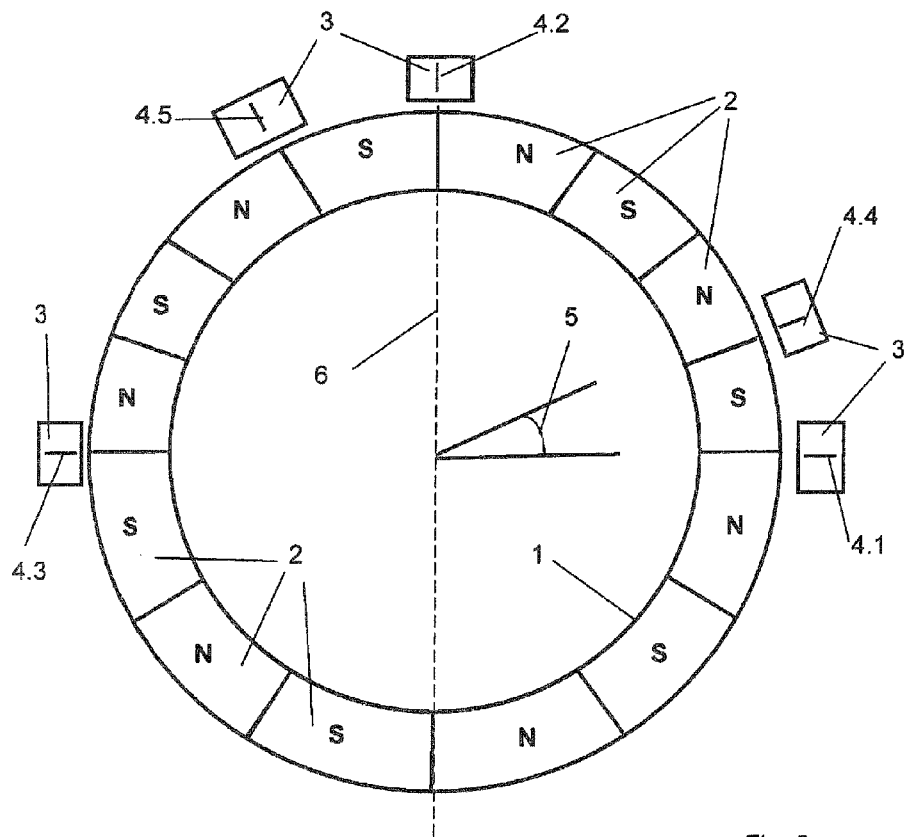
Figure 5:
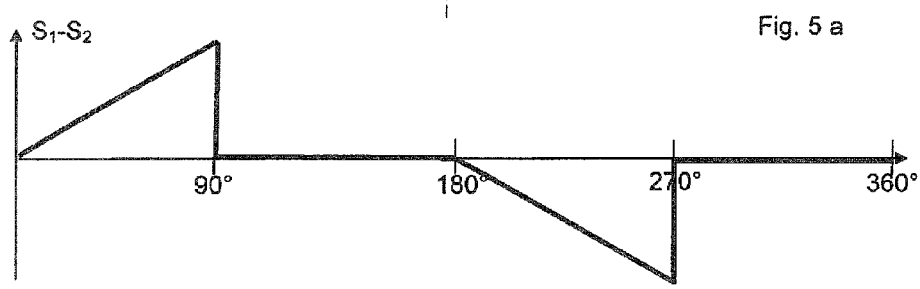
Figure 5:
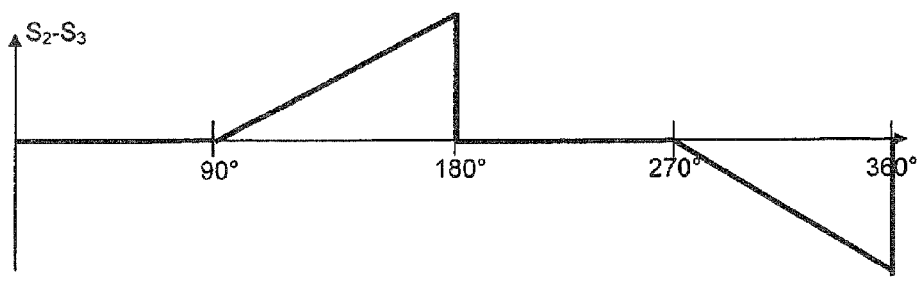
Figure 5:
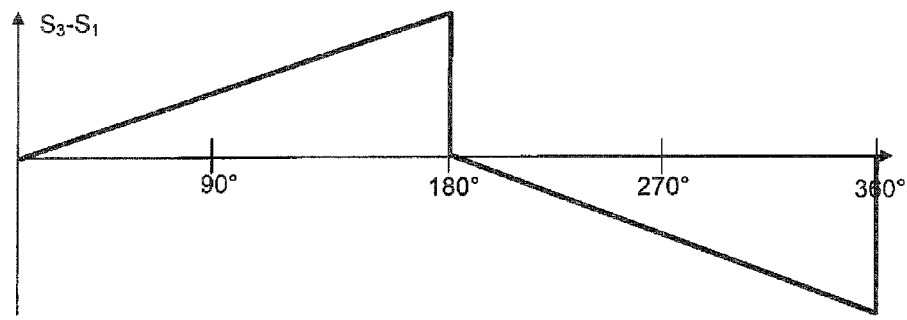

FIG. 5a shows schematically an example of an absolute angle measuring system according to the invention. A circular scale 1 (also referred to as magnet wheel) includes, as illustrated in the upper half, a first group of magnetic segments 2 having an identical length and in the lower half a second group of magnetic segments 2, each also having an identical length which, however, is different from the length of the segments 2 of the first group. Both groups are symmetric with respect to the symmetry axis 6 which extends through the rotation axis and is fixedly connected with the magnet wheel 1. The angle a indicated with the reference symbol 5 is to be measured. To this end, the sensors 4.1 to 4.5 are arranged with a mutual offset on sensor supports 3 along the periphery of the magnet wheel 1. The employed magnetoresistive sensors consist of two Wheatstone bridges, like in the aforedescribed exemplary embodiments. The two bridges provide an offset of the displayed phase of the field because they are displaced relative to one another on the sensor support 3. For anisotropic magnetoresistive sensors, the displacement is a quarter of one of the two existing segment lengths, and for GMR sensors half of the segment lengths. In addition, the magnetoresistive thin films forming the bridges are distributed on the sensor supports 3 so as to eliminate or at least attenuate effects from harmonics in their signals.

FIG. 5b shows the functional dependence of the phase differences between the sensors 4.2 and 4.1 ($S_2-S_1$) and between the sensors 4.3 and 4.1 ($S_3-S_1$) when the magnet wheel 1 is rotated by 360°. The unillustrated evaluation unit can be used to unambiguously determine from the illustrated result which quadrant faces the first sensor 4.1. In addition, the value of the angle 5 can be determined from the value of the phase difference. Advantageously, it can be deduced from this preliminary value of the angle 5 which segment 2 faces the first sensor 4.1 and the third sensor 4.3, respectively. If, for example, the sensor 4.1 is free of harmonics for the larger segment length and the sensor 4.3 is free of harmonics for the shorter segment length, then the phase of all segments 2 can be measured with high resolution and high accuracy by selecting the corresponding suitable sensor 4.1; 4.3, which also allows determination of the angle values with these properties.

Unfortunately, four points (0°; 90°; 180°; 270°) exist in this angle determination where all these differences become zero. These four point-shaped measurement uncertainties can be eliminated, for example, by using two additional sensors 4.4 and 4.5. When the phase differences $S_4-S_1$ and $S_5-S_2$ are formed, the association is as depicted in the following table:

| a | $S_4-S_1$ | $S_5-S_2$ |
|---|---|---|
| 0° | 0 | 0 |
| 90° | >0 | 0 |
| 180° | >0 | >0 |
| 270° | 0 | >0 |

This absolute measurement requires the use of a total of five anisotropic magnetoresistive sensors. In spite of this complexity, the described arrangement can be viewed as advantageous when taking into consideration the difficulties that must be overcome with measuring systems in order to enable rotation of a single magnet by 360° when using anisotropic magnetoresistive sensors.

It appears that using GMR sensors with any unambiguousness region of 360° is more advantageous. The phase difference of the GMR sensors 4.3 and 4.1 is illustrated in the diagram in FIG. 5c. This difference $S_3-S_1$ can be uniquely associated with the angle over the entire measurement range of 360°, except for the points 0° and 180°. An additional sensor 4.4 is required to establish unambiguousness. If this sensor is arranged on the periphery of the magnet wheel with an offset of two shorter segment lengths relative to the sensor

4.1, then the phase difference $S_4$–$S_1$ is equal to 0 at an angle of 0° and greater than 0 at an angle of 180°. Sensors compensated for harmonics have similar advantages as those described above.

Figure 6:
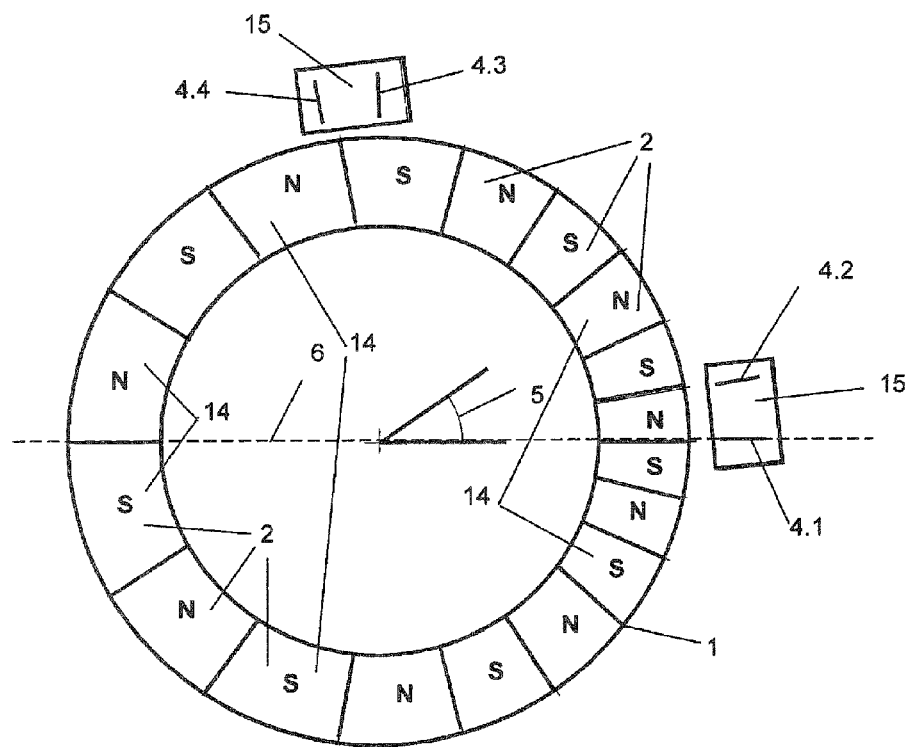
Figure 6:
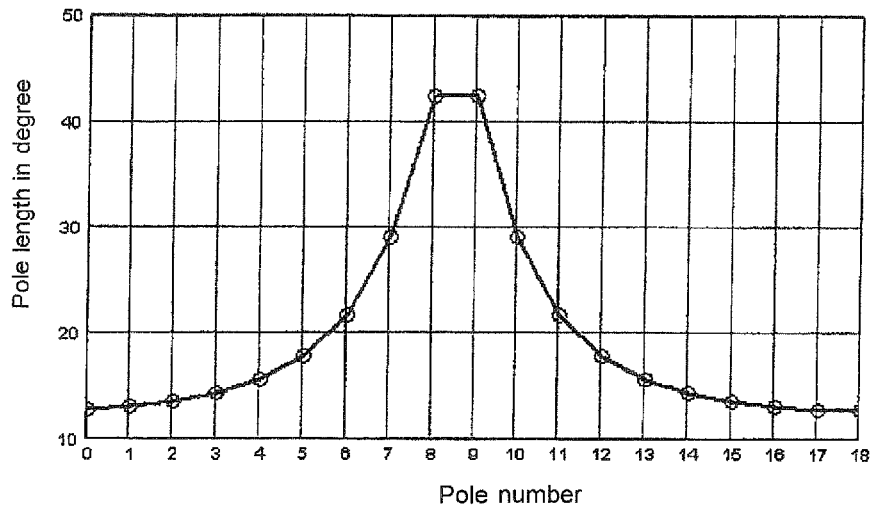
Figure 6:
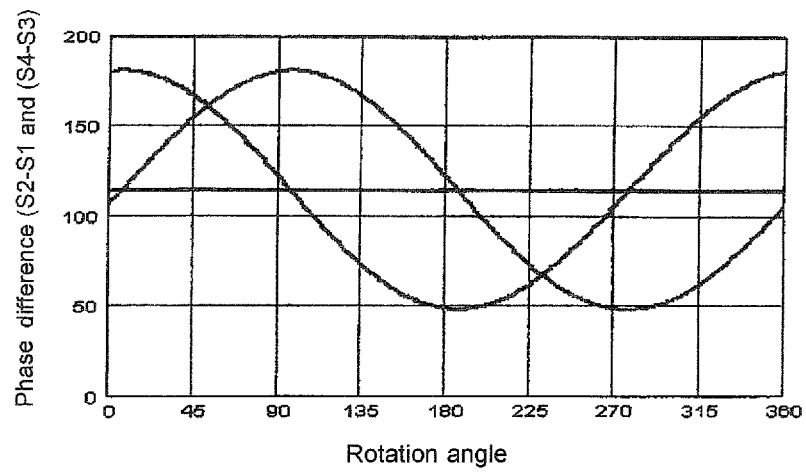

FIG. 6a shows schematically the structure of an additional absolute angle sensor. A magnet wheel (scale) 1 is constructed in a first semicircle of magnetic segments with a length that steadily increases with increasing angle 5. The segment lengths in the second semicircle are symmetric with respect to the symmetry axis 6 through the center of the magnet wheel. Groups 14 of segments 2 of identical length are here not formed by adjacent segments 2, but rather by symmetrically arranged segments 2. Two supports for sensor pairs 15 which are offset by 90° are arranged on the magnet wheel. Each have two sensors 4.1; 4.2 and 4.3; 4.4 with identical spacing. For example, anisotropic magnetoresistive sensors with Wheatstone bridges rotated by 45° are used. The length of the segments 2 is selected so that the direction 13 of the magnetic field is defined for a complete revolution of the angle 5 from a=0 to 360° about the magnet wheel 1 comprised of n poles by the relationship $\beta(a)=a*(1+n/2)+A*\sin(a)$, wherein A is a constant. FIG. 6b shows an example for the segment lengths determined with this relationship. The segment length is here given by the dimensions of the North and South Poles, respectively, in degrees. The diagram of FIG. 6c shows the curves for the phase differences $S_2$–$S_1$ and $S_4$–$S_3$ determined from the measurement values of the sensor pairs 4.2, and 4.3 and 4.4, respectively, in the evaluation unit, for a full revolution of the angle 5. Two sinusoidal curves with a relative offset of 90° are obtained. The rotation angle 5 can be uniquely determined therefrom with the evaluation unit by using the arctan interpolation. Like in the preceding exemplary embodiments, this angle can also be used for identifying the segment 2 facing the sensor 4.1, so that a better resolution and accuracy can be obtained when taking into account the phase angle measured with that sensor 4.1. When dimensioning the segments 2 with the defined sensor spacing, only values of A are permitted that result in phase differences of less than 180° in order to ensure unambiguousness of the values of the phase differences obtained with the arctan interpolation. This value can be increased to 360° when using GMR sensors. Use of GMR sensors does not provide any other advantages in the system.

The segment distribution according to FIG. 6a can have the important advantage compared to an arrangement with a monotonously increasing segment length over the full circumference of the magnet wheel in that adjacent segments 2 in FIG. 6a differ only slight in length. Accordingly, the proposed arrangement can effectively prevent a field distribution that leads to an effective lengthening of longer segments 2 and shortening of shorter adjacent segments 2. In an arrangement with monotonously increasing segment lengths, the shortest and the longest segment would be directly adjacent. The effective change in the segment length would be so large that the shortest segment would be shortened by a significant amount, which would cast doubt over a high measurement accuracy in the angle measurements.

The application of the features of the invention can lead to many additional advantageous arrangements and methods for the absolute measurement of angles and positions, which may be associated with the present invention. For example, angle measuring system based on the aforedescribed examples of length measurements and length measuring systems may be feasible, which can be directly applied to angle measurement.

What is claimed is:

1. An arrangement for absolute determination of a linear position or of a rotation position expressed by an angle of two bodies adapted to be displaced or rotated relative to one another, comprising:
   a first body having a scale with a plurality of magnetic segments that alternate in polarity in a measurement direction;
   a second body having at least two spaced-apart magnetic-field-sensitive sensors for obtaining an angle of the magnetic field at each of the magnetic-field-sensitive sensors; and
   an evaluation unit for determining from the obtained angle of the magnetic field at each of the magnetic-field-sensitive sensors a phase difference that corresponds with the position being measured,
   wherein the scale comprises a single magnetic track comprising multiple groups, each of the multiple groups having at least two magnetic segments, with a length of the at least two magnetic segments in the measurement direction in at least one group being identical to one another, and lengths of the magnetic segments of different groups being different from one another.

2. The arrangement of claim 1, wherein a surface of the scale is covered with a non-magnetic layer, with a thickness of the non-magnetic layer at a location is selected to increase with increasing length of the segments at that location.

3. The arrangement of claim 1, wherein groups of the magnetic segments having identical thickness each comprise of two directly adjacent segments with opposite magnetization directions.

4. The arrangement of claim 1, wherein the magnetic field-sensitive sensors are magnetoresistive sensors.

5. The arrangement of claim 1, comprising two spaced-apart sensors.

6. The arrangement of claim 1, further comprising a first sensor and a second sensor spaced from first sensor, with a first spacing sufficiently small so that a phase difference during travel across the entire scale can be unambiguously associated with a measurement coordinate value, and a third sensor spaced from first sensor by a second spacing that is at least twice the first spacing.

7. The arrangement of claim 1, wherein a thickness of the magnetic segments increases with decreasing length in the measurement direction.

8. The arrangement of claim 7, wherein a magnetic segment comprises a layer of a magnetizable material, and wherein the thickness of the layer of the magnetizable material at a location of the scale is selected to increase with decreasing length of the magnetic segments at that location.

9. The arrangement of claim 7, wherein a magnetic segment comprises a layer of a magnetizable material, and wherein the thickness of the layer of the magnetizable material of the scale is constant over an entire measurement length, while a magnetized portion of the layer thickness varies.

10. The arrangement of claim 1, wherein the magnetic field-sensitive sensors are anisotropic magnetoresistive sensors each comprising two sensor elements implemented as measurement bridges.

11. The arrangement of claim 10, wherein the measurement bridges are rotated relative to one another by 45°.

12. The arrangement of claim 10, wherein the measurement bridges are arranged with a spacing to a segment corresponding to approximately a quarter of an average segment length.

13. The arrangement of claim 10, wherein the measurement bridges are spaced apart by a quarter of a length of segments in a group.

14. The arrangement of claim 13, wherein the measurement bridges comprise an arrangement of magnetoresistive thin-film strips configured to reduce harmonic components in signals derived from the measurement bridges.

15. The arrangement of claim 1, wherein the scale comprises a magnet wheel for angle measurements with a rotation axis, wherein the magnet wheel is mirrorsymmetric with respect to a plane in which the rotation axis is located.

16. The arrangement of claim 15, wherein an angular dimension of the magnetic segments of the magnet wheel is selected so that a magnetic field direction 11 for a full revolution of the magnet wheel from a=0 to 360° is given by $11(a)=a*(1+n12) +A*\sin(a)$, wherein A=const., a=rotation angle, and n=number of poles, and wherein two sensor pairs comprised of a first sensor and a spaced apart second sensor are offset relative to one another by a predetermined angle.

17. A method for absolute determination of a linear position or of a rotation position expressed by an angle of two bodies that can be displaced or rotated relative to one another, with a first body having a scale with a plurality of magnetic segments that alternate in polarity in a measurement direction, a second body having at least two spaced-apart magnetic-field-sensitive sensors for obtaining an angle of the magnetic field at each of the magnetic-field-sensitive sensors, and an evaluation unit for determining from the obtained angle of the magnetic field at each of the magnetic-field-sensitive sensors a phase difference that corresponds with the position being measured, wherein the scale comprises a single magnetic track comprising multiple groups, each of the multiple groups having at least two magnetic segments, with a length of the at least two magnetic segments in the measurement direction in at least one group being identical to one another, and lengths of the magnetic segments of different groups being different from one another, the method comprising the steps of:
computing an output signal from a plurality of sensor signals in the evaluation unit, and
unambiguously associating the output signal with the linear position or the rotation position.

18. The method of claim 17, wherein the output signal is determined from a first signal component that indicates an index of the segment located opposite one of the sensors, and a second signal component that determines from the output signal from the one sensor a distance of the one sensor from an starting point of the corresponding segment.

19. The method of claim 18, wherein the first and second signal components are determined for a plurality of sensors and wherein position results are averaged by taking into account sensor spacings.

20. The method of claim 18, further comprising the steps of:
determining with the evaluation unit from the two corresponding signals from first sensors and spaced-apart second sensors arranged in measurement bridges rotated by 45° corresponding angles of field directions at a location of the respective sensors by arctan interpolation, and
forming the first signal component of the output signal by computing a difference between the determined angles.

21. The method of claim 18, wherein the arrangement has a first sensor and a second sensor spaced from first sensor, with a first spacing sufficiently small so that a phase difference during travel across the entire scale can be unambiguously associated with a measurement coordinate value, and a third sensor spaced from first sensor by a second spacing that is at least twice the first spacing, further comprising the steps of:
determining from two corresponding signals of the first, second and third sensors angles of the field direction at locations of the corresponding sensors, and
determining from a difference in the angles of the first and second sensors a period of the difference of the angles of the second and third sensor that corresponds to the difference in the angles of the first and second sensors, and
determining from a phase value of this period the segment that faces the first sensor.

22. The method of claim 18, further comprising the steps of:
determining in a first step with the evaluation unit by arctan interpolation from two corresponding signals of first sensors and spaced-apart second sensors arranged in measurement bridges that are spaced apart by a quarter of a length of segments in a group the corresponding angles of field directions at the location of the corresponding sensors,
forming a preliminary first signal component of the output signal by computing a difference,
determining from the preliminary first signal component of the output signal a length of the segment facing the first sensor, computed from the determined length of the segment and a spacing between the first and second sensors a phase difference between the two field directions at the first and second sensors, and
in a second step, determining the first signal portion again from the computed phase difference.

23. The method of claim 22, and further performing additional iteration steps.

24. The method of claim 18, wherein an angular dimension of the magnetic segments of a scale implemented as a magnet wheel is selected so that a magnetic field direction 13 for a full revolution of the magnet wheel from a=0 to 360° is given by $11(a)=a*(1+n/2)+A*\sin(a)$, wherein A=const., a=rotation angle, and n=number of poles, and wherein two sensor pairs comprised of a first sensor and a spaced-apart second sensor are offset relative to one another by a predetermined angle, the method further comprising the steps of:
obtaining from the signals of the two sensor pairs two phase-shifted periodic signals with a period of 360°, and
evaluating the periodic signals to produce a unique angle measurement value in a range of 360°.

25. The method of claim 24, wherein the phase shift between the periodic signals is 90°.

26. A device for absolute determination of a linear position or of a rotation position expressed by an angle of two bodies adapted to be displaced or rotated relative to one another, comprising:
a first body having a scale with a plurality of magnetic segments that alternate in polarity in a measurement direction;
a second body having at least two spaced-apart magnetic-field-sensitive sensors; and
an evaluation unit,
wherein the scale comprises groups having each at least two magnetic segments, with a length of the at least two magnetic segments in the measurement direction in at least one group being identical to one another, and lengths of the magnetic segments of different groups being different from one another, and
wherein a thickness of the magnetic segments increases with decreasing length in the measurement direction.

27. A device for absolute determination of a linear position or of a rotation position expressed by an angle of two bodies adapted to be displaced or rotated relative to one another, comprising:
- a first body having a scale with a plurality of magnetic segments that alternate in polarity in a measurement direction;
- a second body having at least two spaced-apart magnetic-field-sensitive sensors; and
- an evaluation unit,
- wherein the scale comprises groups having each at least two magnetic segments, with a length of the at least two magnetic segments in the measurement direction in at least one group being identical to one another, and lengths of the magnetic segments of different groups being different from one another, and
- wherein a surface of the scale is covered with a non-magnetic layer, with a thickness of the non-magnetic layer at a location is selected to increase with increasing length of the segments at that location.

28. A device for absolute determination of a linear position or of a rotation position expressed by an angle of two bodies adapted to be displaced or rotated relative to one another, comprising:
- a first body having a scale with a plurality of magnetic segments that alternate in polarity in a measurement direction
- a second body having at least two spaced-apart magnetic-field-sensitive sensitive sensors; and
- an evaluation unit,
- wherein the scale comprises groups having each at least two magnetic segments, with a length of the at least two magnetic segments in the measurement direction in at least one group being identical to one another, and lengths of the magnetic segments of different groups being different from one another,
- wherein the scale comprises a magnetic wheel for angle measurements with a rotation axis, wherein the magnetic wheel is mirror-symmetric with respect to a plane in which the rotation axis is located, and
- wherein an angular dimension of the magnetic segments of the magnet wheel is selected so that a magnetic field direction B for a full revolution of the magnet wheel from a=0 to 360° is given by $13(a)=a*(1+n/2)+A*\sin(a)$, wherein $A=$ const., a=rotation angle, and n =number of poles, and wherein two sensor pairs comprised of a first sensor and a spaced-apart second sensor are offset relative to one another by a predetermined angle.

29. A method for absolute determination of a linear position or of a rotation position expressed by an angle of two bodies that can be displaced or rotated relative to one another, with a first body having a scale with a plurality of magnetic segments that alternate in polarity in a measurement direction, a second body having at least two spaced-apart magnetic-field-sensitive sensors, and an evaluation unit, wherein the scale comprises groups having each at least two magnetic segments, with a length of the at least two magnetic segments in the measurement direction in at least one group being identical to one another, and lengths of the magnetic segments of different groups being different from one another, the method comprising the steps of:
- computing an output signal from a plurality of sensor signals in the evaluation unit, and
- unambiguously associating the output signal with the linear position or the rotation position,
- wherein the output signal is determined from a first signal component that indicates an index of the segment located opposite one of the sensors, and a second signal component that determines from the output signal from the one sensor a distance of the one sensor from an starting point of the corresponding segment.

* * * * *